UNITED STATES PATENT OFFICE.

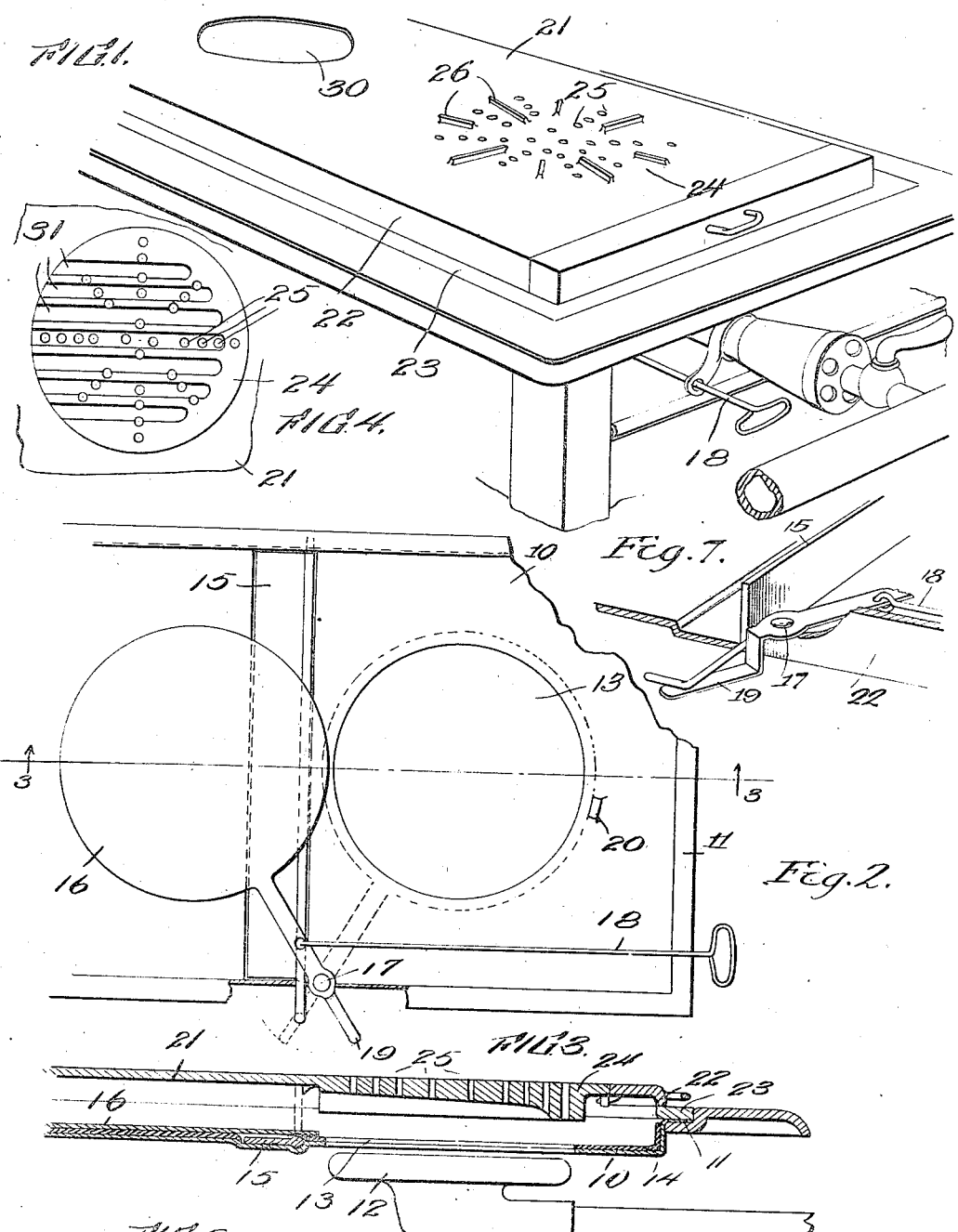

LOUIS C. WITKOWSKI, OF COLLINGSWOOD, NEW JERSEY, ASSIGNOR OF ONE-FOURTH TO EDWARD T. FENWICK, OF WASHINGTON, DISTRICT OF COLUMBIA.

HEAT STORING AND RADIATING DEVICE.

1,176,187. Specification of Letters Patent. Patented Mar. 21, 1916.

Application filed August 21, 1915. Serial No. 46,718.

*To all whom it may concern:*

Be it known that I, LOUIS C. WITKOWSKI, a citizen of the United States, residing at Collingswood, in the county of Camden and State of New Jersey, have invented certain new and useful Improvements in Heat Storing and Radiating Devices; and I do hereby declare the following to be a full, clear, and exact description of the invention, such as will enable others skilled in the art to which it appertains to make and use the same.

This invention relates to storing and conservation applied to stoves and like heating elements, and has for an object to provide a device to absorb and store heat, with means for inclosing the absorbing and storing elements in a heat insulating chamber for the conservation of the same.

A further object of the invention is to provide a chamber spaced above a heating element having openings communicating from the heating element to the chamber, and a flue leading out from the heating chamber with means for closing the openings above the heating element and leading from the heating element by the use of heat insulating material to close the chamber.

A further object of the invention is to provide a chamber having an opening in the bottom for heating element and immediately above such opening a thickened and specially constructed heat absorbing and storing element with means for closing the chamber for conserving the heat of the heat absorbing element.

A further object of the invention is to provide a heat receiving and storing element adapted to be spaced above a heating element, said heat absorbing and storing element being provided with openings therethrough, and with tapered grooves positioned to conduct the products of combustion and likewise to expose to the heat a greater surface for heat absorption.

With these and other objects in view the invention consists in certain novel features of construction, combination and arrangement of parts as will be hereinafter more fully described and claimed.

In the drawings: Figure 1 is a perspective view of a conventional gas stove with the improved heat storing and conserving member attached thereto. Fig. 2 is a top plan view with the immediate top of the stove removed showing the dampers. Fig. 3 is a longitudinal perspective view taken on line 3—3 of Fig. 2. Fig. 4 is an inverted plan view of the thickened absorbing member. Fig. 5 is a detail view of the means employed for varying the size of the top to conform to different sizes of openings. Fig. 6 is a view in edge elevation of the heat absorbing and storing elements. Fig. 7 is a view in perspective showing the means for controlling the dampers.

Like characters of reference designate corresponding parts throughout the several views.

The improved heat conserver forming the subject-matter of this application comprises a pan 10 having a flange 11 adapted to set into the top of an ordinary heater with a heating element 12 spaced below the opening 13 in such pan. The pan is preferably lined with heat insulating material shown at 14 and is provided with a damper 15 adapted to swing to vertical position as shown in dotted lines at Fig. 2 to form a chamber surrounding the opening 13.

A second damper 16 is also provided movable in any approved manner as by pivoting at 17, and manually operated by any approved means as by the rod 18 extending to a position for easy access by the operator. The damper 16 is also preferably provided with a finger 19 which, when swung about the arc of its pivot 17 as shown in dotted lines at Fig. 2, will operate the damper 15 so that both dampers are closed at the same interval—the damper 16 covering the opening 13 and the damper 15 closing one side to form a chamber surrounding such damper 16. To properly position the damper when it is manually closed a lug 20 is provided as shown at Fig. 2 against which the periphery of the damper 16 abuts.

Located above the pan 10 is a cover member 21 having a downwardly turned flange 22 and lip 23 which preferably rests upon the flange 11 of the pan 10 to form a substantially heat resisting joint.

Located immediately above the heating element 12 the cover member 21 is thickened as shown at Fig. 3, and Fig. 6, to form material of such thickness as to absorb and store heat from the heating element 12. At this thickened portion 24 holes or openings 25 are provided so that the products of combustion from the burner 12 will pass upwardly through said openings into engagement with the utensil disposed upon the top of such heat conserving element. Also ribs 26 may be provided if desired as shown at Fig. 1, but such ribs are not essential to the invention, and are omitted at Fig. 3.

If found desirable, the top 21 may be made adjustable by providing a strip 27 with transverse slots 28 secured to the top 21 and the pan 10 by the use of bolts 29. It is believed, however, that such adjustable feature will not be essential to the invention and that the top 21 and pan 10 may be constructed in a sufficient variety of sizes to correspond to stoves of the usual and ordinary construction without such adjustability.

In operation, the dampers 15 and 16 will be positioned as shown at Fig. 2 and the heating element 12 will be ignited. The article to be heated will then be set upon the top immediately over the holes 25 and upon the ribs 26 if such ribs are employed. Part of the products of combustion from the heating element 12 will pass upwardly through the holes 25 into engagement with the article set thereon, while other parts of the products of combustion will serve to heat the thickened and heat conserving element 24. When a sufficient amount of heat has been introduced into the article, or the contents have been brought to a boil dependent upon the nature of the material being cooked, the flame at the heating element 12 may be extinguished and the heat stored in the heat conserving element 24 will serve to continue the cooking of the material—it being understood of course that the dampers 15 and 16 are thereupon closed to form a chamber of heat insulating material surrounding the heat conserving element 24, thereby conserving the heat stored in such heat conserving element and making radiation take place principally at the point covered by the utensil. In this manner the device partakes of the nature of a fireless cooker having a heat storing and conserving feature resident in the heat insulating chamber surrounding the heat absorbing member.

The top 21 is also preferably provided with an opening 30, and the heat absorbing and storing member 24 is provided with grooves 31 inclined or tapered rearwardly as shown at Fig. 3 whereby the products of combustion from the heating element 12 are directed backwardly to the opening 30, so that if desired another utensil may be used upon the opening 30 and the products of combustion or heated gas is directed backwardly over the downwardly turned damper 15 to heat such utensils disposed at the opening 30. By inclosing the utensil in a heat insulated cover or hood of substantially the usual and ordinary type radiation of heat from the utensil is permitted and the fireless cooker features above referred to are augmented.

I claim:—

1. The combination with a chamber having an opening, of a heating element beneath and registering with the opening, means to raise and lower one wall of the chamber, a member adapted to cover the opening, and means to actuate the wall and the covering member simultaneously.

2. The combination with a heating element, of a chamber located above the heating element and having an opening registering with the heating element, an opening formed in the top of the chamber spaced from the heating element, a heat-absorbing member disposed above the heating element, and having openings therethrough and inclined grooves in the under side, means to close the opening above the heating element, and a partition between the opening in the bottom and the opening in the top of the chamber adapted to be raised and lowered.

3. The combination with a heating element, of a chamber located above the heating element having an opening in its bottom registering with the heating element, and also an opening in the top spaced from the opening in the bottom, a heat-absorbing and radiating element located in the top of the chamber above the heating element and provided with openings therethrough and inclined grooves, means to close the opening in the bottom of the chamber, a partition closable between the opening in the bottom and the opening in the top of the chamber, and means to actuate the partition and the bottom closing member simultaneously.

4. The combination with the heating element, of a chamber located above the heating element and having an opening offset from the heating element, and a thickened heat-absorbing element located above the heating element and provided with grooves enlarged toward the offset opening, said groove being located within the chamber.

5. The combination with a heating element, of a chamber located above the heating element and having a top formed with a thickened portion immediately above the heating element and an opening offset therefrom, and ribs formed upon the under side of the thickened heat-absorbing element forming grooves enlarged toward the offset opening.

6. The combination with a heating element, of a chamber formed above the heating element and provided with a thickened heat-absorbing member above the heating element, said heat-absorbing member being provided with perforations therethrough, the top of the chamber being also provided with an opening offset from the heating element, said chamber increasing in capacity above that side of the heating element nearest the offset opening, and ribs formed along the under side of the heat-absorbing member producing grooves directed toward the offset opening.

7. In a device of the class described, a burner, and means forming a heating chamber, said chamber including a top having a thickened portion above the burner, and having an opening distant from the burner, said thickened portion having grooves on the lower side increasing in capacity in a longitudinal direction above that side of the burner nearest the opening.

8. In a device of the class described, a burner, and means forming a heating chamber, said chamber including a top having a thickened portion above the burner, and having an opening distant from the burner, said thickened portion having grooves on the lower side increasing in capacity in a longitudinal direction above that side of the burner nearest the opening, and having apertures extending through the thickened portion, the walls of apertures at gradually increasing distances from the opening presenting increased heating surface.

9. In a device of the class described, a source of heat, a heat absorbing member substantially continuous above the source of heat, and means for directing the products of combustion in a given direction including ribs on the lower side of said member forming grooves gradually deepened from one portion longitudinally toward one end for increasing their capacity longitudinally above that portion of the source of heat where the combustion is more complete.

10. In a device of the class described, a burner, a heat absorbing member substantially continuous above the burner provided with means causing the rapid absorption of heat throughout the body thereof, and means above the burner for isolating a body of air between the member and burner after combustion has ceased, for preventing lower surface radiation from said member and causing the heat from said surface to pass through the member.

11. In a device of the class described, a burner, a thickened heat absorbing member substantially continuous above the burner and provided with grooves on the lower side and with apertures causing the rapid absorption of heat throughout the body of the member, and means above the burner for isolating a body of air between the member and burner after combustion has ceased, for preventing lower surface radiation from said member.

In testimony whereof I affix my signature.

LOUIS C. WITKOWSKI.